OR 3,778,701

United Stat
Runge

[11] 3,778,701
[45] Dec. 11, 1973

[54] METHOD OF ULTRA LONG SPACED ELECTRIC LOGGING OF A WELL BORE TO DETECT HORIZONTALLY DISPOSED GEOLOGICALLY ANOMALOUS BODIES IN THE VICINITY OF MASSIVE VERTICALLY DISPOSED GEOLOGICALLY ANOMALOUS BODIES LATERAL TO AND NOT INTERCEPTED BY THE WELL BORE

[75] Inventor: Richard J. Runge, Anaheim, Calif.

[73] Assignee: Chevron Research Company, San Francisco, Calif.

[22] Filed: Apr. 21, 1972

[21] Appl. No.: 246,289

Related U.S. Application Data

[63] Continuation-in-part of Ser. No. 22,414, March 25, 1970, abandoned.

[52] U.S. Cl. .................................................. 324/10
[51] Int. Cl. ............................................... G01v 3/18
[58] Field of Search .................................. 324/1, 10

[56] References Cited
UNITED STATES PATENTS
2,206,892 7/1940 Hawley .................................... 324/1
2,960,651 11/1960 Scotty .............................. 324/10 X
3,256,480 6/1966 Runge et al. ........................... 324/10
3,453,530 7/1969 Attali ...................................... 324/1

Primary Examiner—Gerard R. Strecker
Attorney—J. A. Buchanan, Jr. et al.

[57] ABSTRACT

An electrode array comprising a current source electrode, two potential electrodes and a sink electrode is used in a well bore to detect horizontally disposed electrically resistive geologically anomalous bodies that are not cut by the well bore when they lie in the vicinity of massive vertically disposed electrically resistive geologically anomalous bodies. Potential detecting electrodes in the array are spaced at nearly equal distances from said current source electrode; one is placed above and one is placed beneath said current source electrode. Resistivity data obtained from said electrode array is compared with short-spaced resistivity data obtained by other means. Differences in the compared data indicate the presence of horizontally disposed electrically resistive geological anomalies lateral to and uncut by the well bore since said electrode array is unresponsive to the presence of the massive vertically disposed electrically resistive geological anomaly.

9 Claims, 7 Drawing Figures

METHOD OF ULTRA LONG SPACED ELECTRIC LOGGING OF A WELL BORE TO DETECT HORIZONTALLY DISPOSED GEOLOGICALLY ANOMALOUS BODIES IN THE VICINITY OF MASSIVE VERTICALLY DISPOSED GEOLOGICALLY ANOMALOUS BODIES LATERAL TO AND NOT INTERCEPTED BY THE WELL BORE

This application is a continuation-in-part of application Ser. No. 22,414, filed on Mar. 25, 1970, now abandoned.

This invention relates to an electric logging method to detect and fix the location of horizontally disposed, electrically resistive, geologically anomalous bodies which lie in the vicinity of massive vertically disposed, electrically resistive geologically anomalous bodies. It is a primary object of this invention to detect in a well bore that does not traverse either body a horizontally disposed body without the effect that a massive vertically disposed, electrically resistive geologically anomalous body creates on electrical logging tool. In this way, a horizontally disposed, electrically resistive geologically anomalous body can be located with reasonable certainty.

In exploration in the Gulf of Mexico region it has long been desirable to be able to define at depth the contour of salt domes since these geologically anomalous bodies often create traps where oil or oil-bearing formations exist. Extensive research by the present inventor and others led to the invention of a method of detecting the presence of such salt domes and other geological anomalies and of determining the approximate distance from the axis of an exploratory bore hole to said geological anomaly. That invention is based upon a comparison of resistivity measurements obtained by conventional short-spaced electric logs with measurements made by a tool in which the potential electrodes were located above the source electrode and at relatively great distances apart. This long-spaced electric log could look farther out into the formation and, therefore, differences between the apparent resistivity measured by the long-spaced electrode electric log and the resistivity measured by the conventional short-spaced log indicated the presence of electrically resistive geological anomalies at relatively large lateral distances since said anomalies would only affect this long-spaced electric log. This previous invention is the subject of U.S. Pat. No. 3;256,480, entitled, "Method of Detecting Geologically Anomalous Bodies Lateral to a Well Bore by Comparing Electrical Resistivity Measurements Made Using Short-Spaced and Long-Spaced Electrode Systems" and commonly called commercially, the ULSEL (Ultra-Long-Spaced Electrode Logging) method. Hereinafter in this specification the ULSEL electrode configuration will be referred to as the "regular array". As used "regular array" refers to the bore hole current electrode A being the lowermost electrode on the logging tool and the B electrode at the surface and generally some distance from the well bore (several thousand feet). The potential electrodes M and N are both above the A electrode.

The "regular array" proved satisfactory at locating the presence of geological anomalies and the approximate distance from the exploratory bore hole to the anomaly. It has proved to be useful and has achieved a promising acceptance in the exploration field. (See, for example, "Ultra-Long-Spaced Electric Log (UL-SEL)", R. J. Runge, A. E. Worthington, D. R. Lucas, Log Analyst Sept.-Oct. 1969; World Oil, April, 1970). The "regular array", however, has difficulty detecting horizontally disposed anomalies located in the vicinity of massive vertically disposed anomalies that are both lateral to the well bore and not cut by it. At lateral distances of particular interest, the data obtained from the "regular array" contains information on both the massive vertical anomaly and the horizontally disposed anomaly, but the portion of the data relevant to the horizontally disposed anomaly is generally dwarfed by the portion relevant to the massive vertical anomaly. Therefore, it is frequently difficult to interpret the composite data to identify the portion relevant to the horizontally disposed anomaly. The method of the present invention generates data which contains information which is primarily relevant to laterally disposed horizontal anomalies and effectively screens out the effects of any adjacent massive vertically disposed anomaly.

The method of the present invention is practiced with an array which consists of one current source electrode A, and two potential, or current collector, electrodes, M and N, and, at a very great distance, a sink electrode, B. One potential electrode, N, is placed above and another potential electrode, M, is placed below the bore hole current source electrode A; this arrangement is called the "split array". The "split array" has the property that where the anomaly is not cut by the well bore, it is generally insensitive to massive substantially vertically disposed anomalies. This is contrary to experience and provable results obtained with conventional short-spaced electrode systems where the formations are cut by the well bore. In such an arrangement, the regular array is superior for identifying a horizontal bed. Accordingly, it is surprising that a split array is superior to a regular array in a long-spaced configuration and capable of identifying a lateral horizontal anomaly in the presence of a vertical anomaly. Additionally, when the potential electrodes are equidistant from the bore hole current source electrode, the resistivity measurement is totally non-responsive to massive vertically disposed anomalies.

Throughout this specification and in the appended claims use is made of the adjectives 'horizontally disposed' and 'massive vertically disposed'. The term 'horizontally disposed' anomaly is meant to refer to an anomaly whose longitudinal axis is inclined to no more than approximately 45° from a horizontal reference plane. Such an anomaly will be readily detectable by the "split array" in a well bore that does not intercept the anomaly, even in the presence of a massive vertically disposed anomaly and therefore falls within the scope of this invention. The term 'massive vertically disposed' anomaly is meant to refer to a massive anomaly whose closest surface lateral to the well bore is substantially parallel to the well bore. Substantial parallelism includes all inclinations up to a deviation of approximately 15° since the inventor has calculated that the "split array" is highly non-responsive to a massive anomaly within this range. Between inclinations of 15° and 45° the "split array" gradually becomes more responsive to a massive anomaly until, at an inclination of about 45°, the "split array" is as responsive to the massive anomaly as the "regular array". Thus, while the "split array" is not quite as advantageous when the massive vertically disposed anomaly is inclined from 15° to 45° its use in the method of the present invention and the practice of the method of the present invention within this range could still be a useful interpretative tool, especially near the lower end of this range.

The method of the present invention can best be understood by describing it against the background of, for example, conventional short-spaced electric logs, the induction log and the ULSEL "regular array". Conventional electric logging tools consist of a current source electrode, and one or more current collector electrodes which are spaced at relatively short distances, generally on the order of a few feet, above the source electrodes, and, at a great distance, a sink electrode. By convention the current source electrode is designated A and the current collector electrodes are designated M, N, and the sink electrode, B. By measuring the variation in values of potential between collector electrodes or by measuring current flow between the source electrodes and a collector electrode various characteristics of a formation immediately surrounding and cut by an exploratory bore hole can be monitored. These monitored characteristics reveal information about the geological structure of the formations that directly surround the exploratory bore hole. Induction logs utilize magnetic fields to induce flow of current in such formations surrounding and cut by a bore hole; the induced current is a measure of the resistivity of the immediate surrounding formation. The ULSEL "regular array" was a radical departure from conventional electric logs as it consisted of two potential electrodes, M and N, placed above a single current source electrode, A, at distances of more than 75 feet, and, at a great distance, a sink electrode, B. The magnitude of the spacing between the electrodes in the "regular array" enabled it to look out into the formation surrounding but not cut by the exploratory bore hole up to distances on the order of the electrode spacing. As recited above, this capability of the "regular array" proved very useful at detecting the presence of large-scale anomalies at considerable distance from the well bore but detection of horizontally disposed anomalies directly adjacent to a massive vertical anomaly such as the side walls of a salt dome proved to be more difficult. It is the horizontal anomalies that are most nearly associated with the accumulation of oil since the oil formation itself is such an anomaly and, overhangs on the side walls of a salt dome are particularly favorable to the accumulation of large reservoirs of oil.

The method of the present invention comprises, simultaneously or sequentially, the steps of:

1. measuring the apparent resistivities of the formations surrounding and at considerable lateral distance from the well bore by using the long-spaced "split array";
2. measuring the apparent resistivities of the formations directly surrounding the well bore by using conventional electric logs or induction logs or by using the "regular array" for the apparent long-range resistivity including a vertical anomaly;
3. comparing the apparent resistivity measured by the longspaced "split array" with the apparent resistivity measured by conventional electric logs, induction logs or the "regular array", a significant disparity between the compared resistivities being an indication of the presence of a horizontally disposed anomaly lateral to the well bore and the magnitude of any disparity being an indication of the distance from the well bore to the anomaly.

In one embodiment of the method of the present invention it has been found that comparison step (3) can effectively be made by comparing the apparent resistivity measured by the "split array" with the resistivity which it is calculated the "split array" should theoretically measure if no horizontally disposed electrically resistive geological anomaly were present. This theoretical resistivity is calculated from the apparent resistivity measured by conventional electric logs, induction logs or the "regular array", and from the spacing of the electrodes of the "split array."

The relationship between the potentials measured by the M and N electrodes of the "split array" and the apparent resistivity, $\rho_A$, of the formation surrounding the exploratory well bore when only a horizontally disposed elecrically resistive geological anomaly is present is as follows:

$$\rho_A = (4 \pi \Delta V)/IG$$

$\Delta V$ = measured potential difference.
I = current emitted from current source electrode.
G = tool geometry factor = $(1/AM) - 1/AN$
 where AM = distance from the current source electrode A to the current collector electrode M beneath it, taken positive according to convention.
 AN = distance from the current source electrode A to the current collector electrode M beneath it, taken negative according to convention.

Thus it can be seen that the measured apparent resistivity, $\rho_A$, of the "split array" is directly proportional to the measured potential difference between the electrodes M and N when only a horizontally disposed anomaly is present. As shown subsequently the measured potential difference is not responsive to massive vertically disposed anomalies. Throughout the above description wherever reference is made to measuring the apparent resistivity, it is permissible to measure and use apparent conductivities in the calculations, so long as the reciprocal relationship between resistivity and conductivity is maintained and the calculations are conducted in a mathematically precise manner.

Further objects and advantages of the present invention will become apparent from the following detailed description of the method and its application in conjunction with the accompanying drawings which form a part of this specification.

In the drawings:

FIG. 1 is a schematic representation of the method of detecting horizontally disposed anomalies, such as irregularity 1 and oil pools 2, 4, 6, 8, 10, 12 and 14, in the vicinity of a massive vertically disposed anomaly, such as salt dome 25.

FIG. 2a is a set of curves showing the calculated theoretical response of the "regular array", with AM = 150 feet and AN = 450 feet, to a nonconducting plane perpendicular to the axis of the exploratory borehole when the nearest edge of the nonconducting plane lines a distance of x ft. from the exploratory borehole. This demonstrates the responsiveness of the "regular array" when only a horizontally disposed electrically resistive anomaly is present.

FIG. 2b is an illustration of the electrode configuration of the "regular array" and defines the quantity $Z_A$, which forms the ordinate in FIG. 2a, and the quantity x which is the distance from a horizontally disposed anomaly to the borehole in which the "regular array"

is operated. A is the current source electrode and M and N are current collector electrodes.

FIG. 3a is a set of curves showing the calculated theoretical response of the "split array" with AM=150 feet and AN = 150 feet to a nonconducting plane perpendicular to the axis of the exploratory borehole when the nearest edge of the nonconducting plane is a distance $x$ from the exploratory borehole. This demonstrates the responsiveness of the "split array" to a horizontally disposed electrically resistive anomaly.

Figure 1:
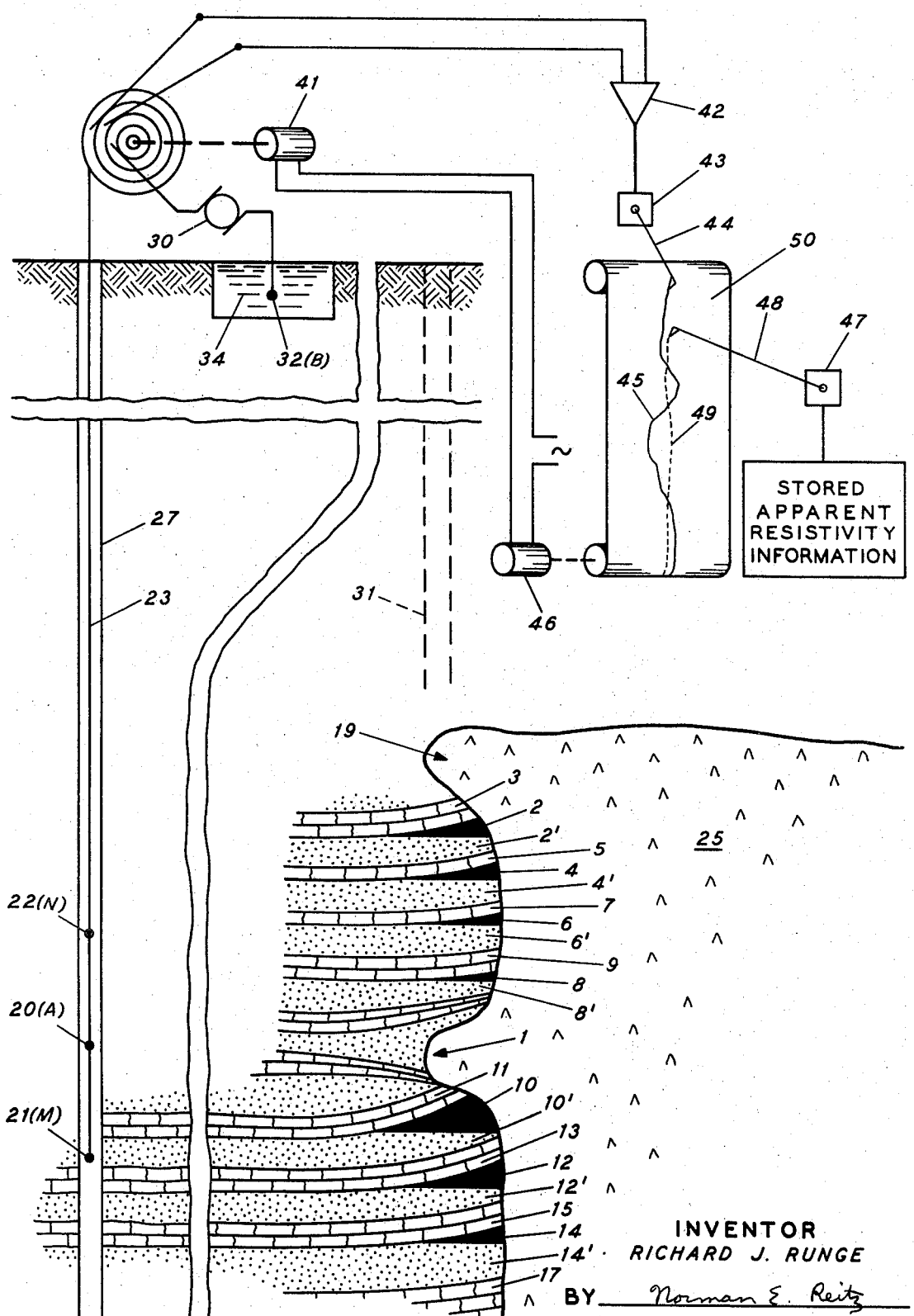

Referring now to the drawings, and particularly to FIG. 1, salt dome 25 has intruded into a sedimentary formation containing sandstone layers 2', 4', 6', 8', 10', 12' and 14', which alternate with impermeable layers 3, 5, 7, 9, 11, 13, 15, and 17, which could be shale or highly compacted sandstone. Overhang 19 and irregularity 1 on the side of salt dome 25 have created traps for the oil originally found within sandstone layers 2', 4', 6', 8', 10', 12', 14', and which now can be found concentrated in pools 2, 4, 6, 8, 10, 12 and 14. An exploratory borehole 27 has missed a potential producing well location 31 by some unknown distance.

The "split array" of the present invention is shown appended to logging cable 23. As the preferred embodiment, current source electrode A, designated as 20, is positioned equidistant between current collector or potential electrodes M and N, respectively designated 21 and 22. The sink electrode B, is designated as 32 and is conveniently located in the drill mud pit 34. Selection of the electrode spacings, AM and AN, for the "split array" will depend upon the distance of the horizontally disposed anomaly from the borehole. The "split array," just as the "regular array" described above, can look out into the formation a distance on the order of the sum of the electrode spacings, e.g. AM plus AN, thus short spacings will be effective for detecting horizontally disposed anomalies that are not intercepted by borehole 27, but are located close to the borehole. Longer spacings will be required for the effective practice of the method of the present invention as the horizontally disposed anomaly to be detected is located farther away from the borehole. For most application AM and AN will be greater than 75 feet so that the "split array" will have a practicable operating range, i.e. a range at least on the order of 150 feet. Current is supplied to current electrodes 20 and 32 by generator 30.

The output of the "split array," in one embodiment of the present invention, is processed by differential analog computer 42, and displayed as trace 45 on continuous record 50 by means of galvanometer 43 and pen 44. It is a measure of the resistivity effects of horizontally shaped anomalous bodies, such as irregularity 1, in the vicinity of the borehole at the depth at which the "split array" is operated. The output is not a measure of the presence of massive vertically shaped anomalies, such as salt dome 25, since massive vertically shaped anomalies have no differential effect on the two potential electrodes. Smaller, horizontally shaped anomalies have differential effects on the current collecting electrodes, depending on which potential electrode is closest to the horizontally disposed anomaly.

A depth-correlated trace 49 representing apparent resistivity measurements made previously either by conventional short-spaced electric logs or induction logs or by the "regular array" of ultra long spaced electrodes, is simultaneously recorded on continuous record 50 by means of galvanometer 47 and pen 48 after retrieval from storage.

In one embodiment of my invention depth-correlated trace 49 is a theoretical resistivity curve calculated to represent the resistivity which the "split array" would measure if no horizontally disposed electrically resistive geological anomaly were present. This theoretical resistivity curve for the "split array" is calculated from resistivity measurements made by conventional electric logs, induction logs or the "regular array."

Figure 4:
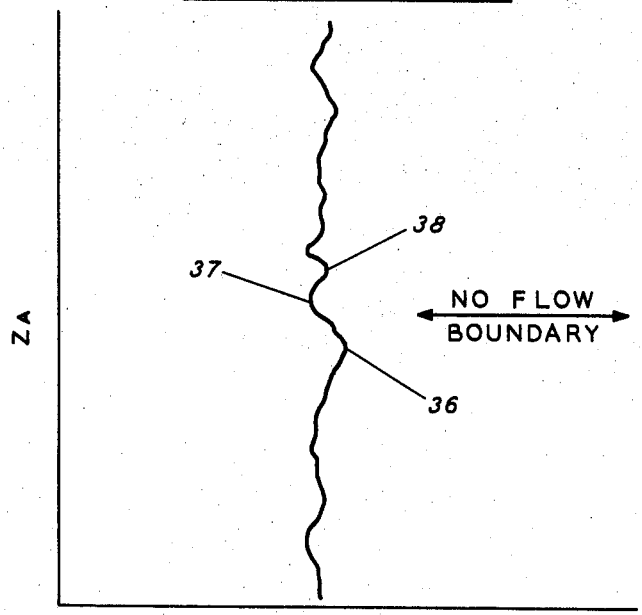
FIG. 4 is the predictable response of the "regular array" to a horizontally disposed anomaly which lies in the vicinity of a massive vertically disposed anomaly. This demonstrates the masking effect of the massive vertically disposed anomaly.

The utility of the method of the present invention extends to the determination of the presence of thin oil sands in the vicinity of massive vertically disposed anomalies and to the mapping of horizontally disposed irregularities in the contours of a massive vertically disposed anomaly. By reference to FIG. 1 it can be seen that thin oil sands, 2', 4', 6', 8' and 10', 12', 14' or oil pools 2, 4, 6, 8, and 10, 12, 14 would have an effect on the "regular array" which would be dwarfed by the effect of massive vertically disposed salt dome 25. For the same reason the existence of irregularity 1 along the side of massive vertically disposed salt dome 25 would not be so easily detectable. The "regular array", when passing irregularity 1 in an upward movement, would respond with the minor undulations indicated on trace 49 of FIG. 1 or with undulations comparable to undulations 36, 37 and 38 of FIG. 4. The "split array," on the other hand, would respond to irregularity 1 with the undulations shown on trace 45 of FIG. 1 or with undulations comparable to undulations 39 and 40 of FIG. 5. The method of the present invention, then, readily detects oil sands 2, 4, 6, 8 and 10, 12, 14 and irregularity 1 of FIG. 1 so long as salt dome 25 is massive and vertically disposed. Detection is accomplished by noting differences between traces 45 and 49. By noting the magnitude of the differences the distance to the horizontally disposed anomaly can be determined by reference to measuring graphs derived from previous runs. Depth-correlated trace 49 is continuously logged by driving continuous record 50 by motor 46 which is synchronized with motor 41 used to drive the drum which holds logging cable 23.

The "regular array" could probably adequately detect overhang 19 in FIG. 1 on massive substantially vertical salt dome 25. Any doubts, however, as to the proper interpretation to be given to experimental data would be resolved by practicing the method of the present invention.

Depth-correlated trace 49 of FIG. 1 can be prepared in a variety of ways. An obvious choice would be the use of the apparent resistivity versus depth information obtainable from running the "regular array." Another choice is the construction of a model of the formation consisting of a large number of layers each of which has a resistivity value assigned to it. The assigned resistivity values can come from measurements taken by conventional short spaced electric logs or from the operation of an induction log. This second choice results in what is commonly called a lumped layered resistivity curve. A further possible choice would be to collect core samples down the well bore, test the samples to determine resistivity and then prepare a resistivity versus depth curve. Another choice would be to utilize resistivity data obtained by means other than the "split array" in conjunction with the known parameters of a given "split array" to calculate the resistivity the given "split array" would measure if no horizontally disposed anomaly were present. Whatever choice is made it is always necessary that the output of the "split array", trace 45, be depth-correlated to the comparison trace 49.

The magnitude of any differences between traces 45 and 49 indicates the distance from the borehole to a horizontally disposed anomaly. Reference graphs can be prepared for any configuration of the "split array" and for the use of "split array" with the various kinds of comparison data so that an operator need merely measure the distance between traces 45 and 49. The measured distance can then be looked up on the reference graphs to translate trace differential distance to a distance from the well bore to the anomaly.

Figures 2A, 2B:
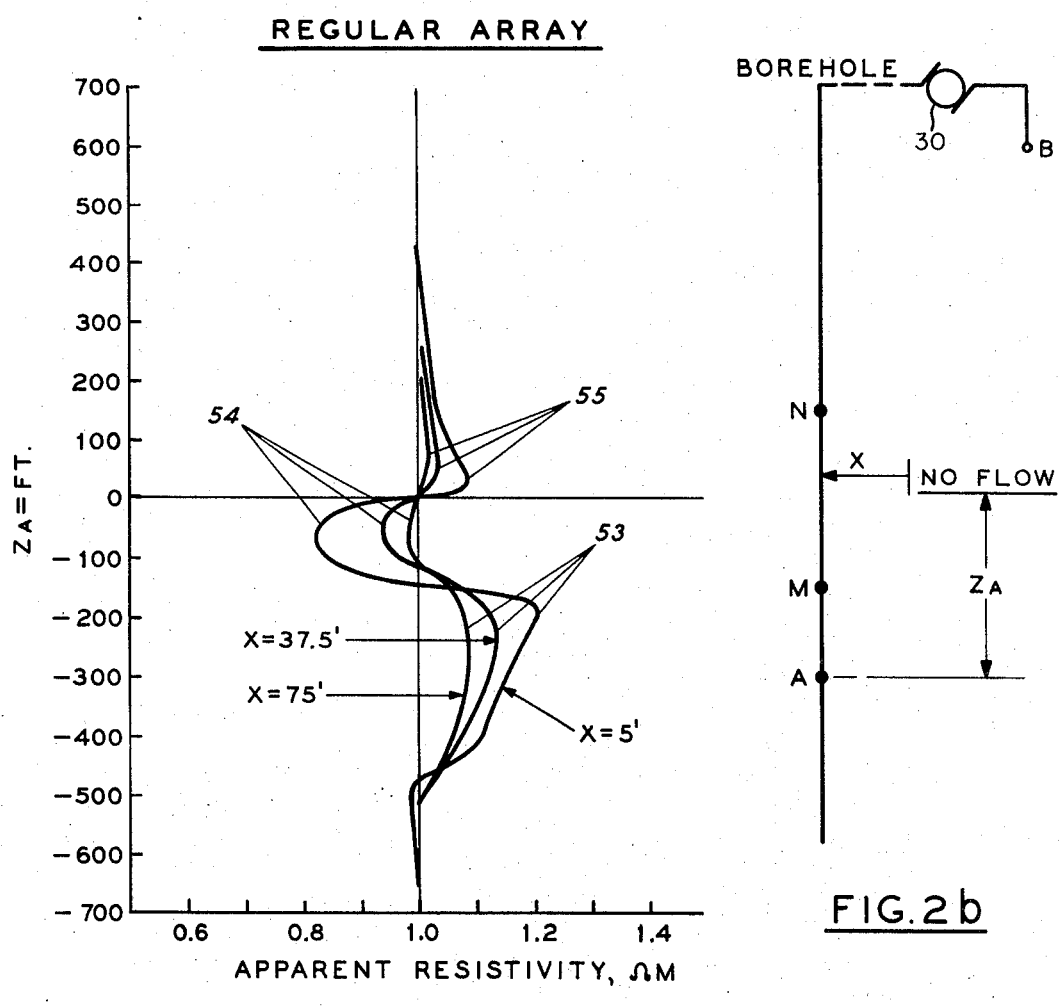
Figure 3A:
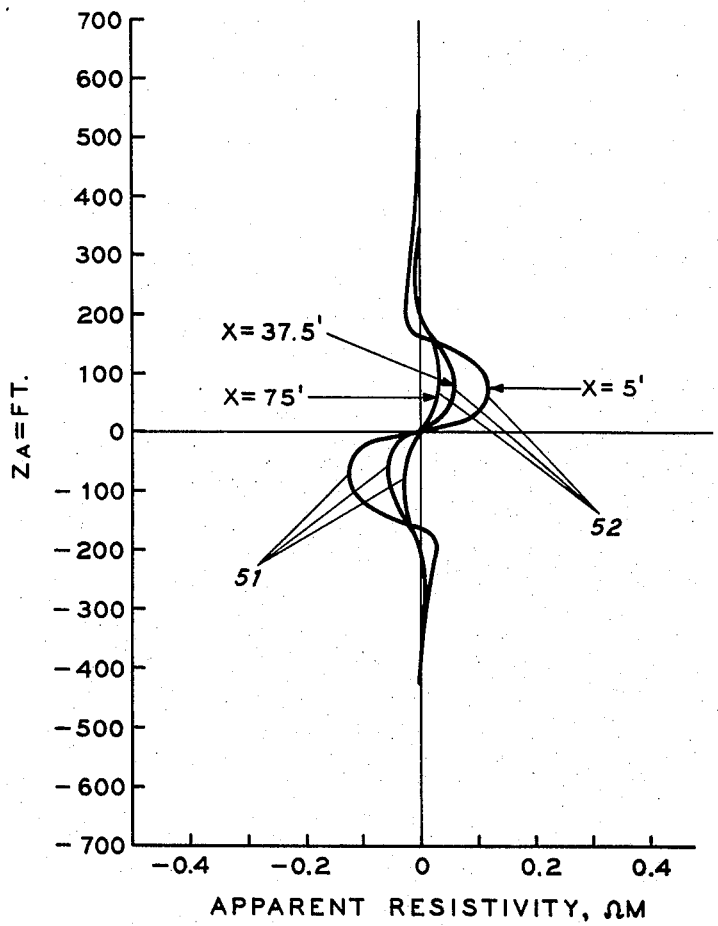
FIG. 3b is an illustration of the electrode configuration of the "split array" and defines the quantity $Z_A$, which forms the ordinate in FIG. 3a, and the quantity $x$ which is the distance from a horizontally disposed anomaly to the borehole in which the "split array" is operated. A is the current source electrode and M and N are current collector electrodes.
Figure 3B:
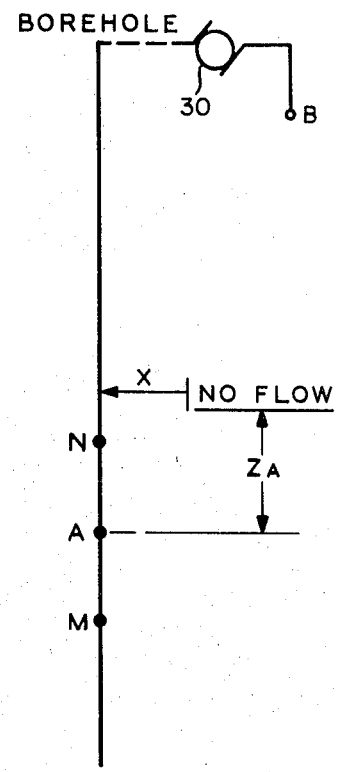

FIG. 2 and FIG. 3 show the calculated responsiveness of the "regular array" and the "split array" respectively to a plane horizontal anomaly located a distance $x$ from the exploratory borehole. The "split array" has both current collector electrodes positioned 150 feet from the current source electrode. The "regular array" has the M current collector electrode positioned 150 feet above A, the current source electrode, and has the N current collector electrode positioned 450 feet above A; this mode of the "regular array," i.e. when the M electrode of the "split array" and the M electrode of the "regular array" are positioned the same distance from the current source electrode A, and the M to N distances are equal, is called the equivalent "regular array". It is evident that the "split array" and the equivalent "regular array" show a significant response to a horizontal anomaly when no massive vertical anomaly is present. When a massive vertical anomaly is present it is not possible to obtain an exact mathematical solution to the relative responses of the two arrays but it can be shown indirectly that the "split array" remains totally responsive to the horizontally disposed anomaly while the equivalent "regular array" is only partially responsive to the horizontally disposed anomaly and conventional electric logging and induction tools do not detect the horizontally disposed anomaly at all. This phenomenon is based upon the fact that the "split array" is nonresponsive to the massive vertically disposed anomaly while the "regular array" is overwhelmed by the presence of the massive vertically disposed anomaly. The apparent resistivity measured by the "split array" situated in a homogeneous medium in the presence of a massive vertical anomaly and in a bore hole parallel to that anomaly is given by the formula $$\rho_A = \frac{\rho}{G}\left(\frac{1}{|AM|} - \frac{1}{|AN|} + \frac{1}{\sqrt{|AM|^2 + 4x^2}} - \frac{1}{\sqrt{|AN|^2 + 4x^2}}\right)$$

where

|AM| is the absolute value of the distance from the current source electrode A to the current collector electrode M located beneath it.

|AN| is the absolute value of the distance from the current source electrode A to the current collector electrode N located above it.

$G$ = is the tool geometry factor = $- 1/|AM| - 1/|AN|$ $\rho$ = is the resistivity of the homogeneous formation surrounding the well bore.

$x$ is the distance from the borehole to the anomaly. Thus, when M and N are placed at nearly equal distances from A so that $|AM| \cong |AN|$ practically no contribution to the measured apparent resistivity is made by the massive vertically disposed anomaly. And, when M and N are placed at equal distances from A no contribution to the measured apparent resistivity is made by the massive vertically disposed anomaly, i.e. the "split array" does not recognize the presence of the massive vertically disposed anomaly.

Figure 5:
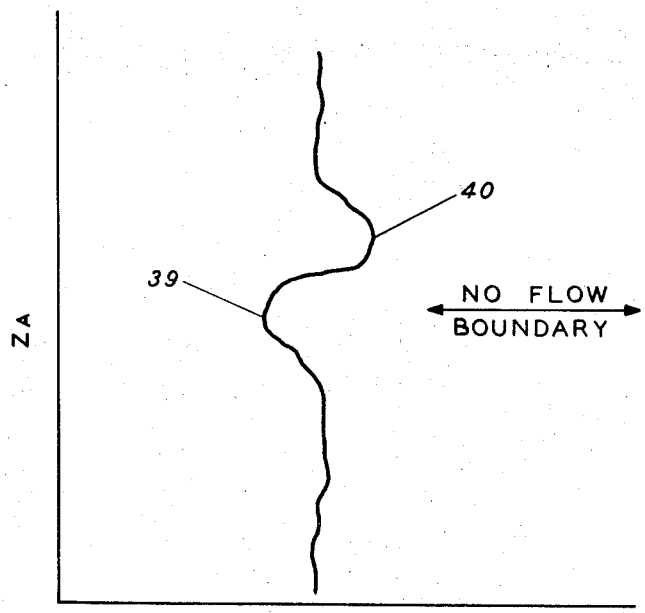
FIG. 5 is the predictable response of the "split array" to a horizontally disposed anomaly which lies in the vicinity of a massive vertically disposed anomaly. This demonstrates the unresponsiveness of the "split array" to the massive vertically disposed anomaly and the responsiveness of the "split array" to the horizontally disposed anomaly.

Although no exact solution is calculable for the situation in which a horizontally disposed anomaly lies in the vicinity of a massive vertically disposed anomaly, it is possible to determine the relative responses of the "split array" and the "regular array." As the "split array" is moved upwardly past irregularity 1 of FIG. 1, a fixed distance from the irregularity, the response would be that shown by undulations about a zero value shown by undulations 39 and 40 of FIG. 5. Undulations 39 and 40 are comparable to undulations 51 and 52 of FIG. 3 which were calculated for the case where no massive anomaly is present. The undulations are comparable because, as shown above, the "split array" does not recognize the presence of the massive vertically disposed anomaly. As the "regular array" is moved upwardly past irregularity 1, the same fixed distance away as the "split array", the response would be that shown by undulations 36, 37 and 38 of FIG. 4. Undulations 36, 37 and 38 of FIG. 4 resemble undulations 53, 54 and 55 of FIG. 2. The resemblance is not great, however, due to the overwhelming masking effect of massive salt dome 25. The method of the present invention eliminates the masking effect and permits the identification of horizontally disposed anomalies in the vicinity of massive vertically shaped anomalies.

While certain specific forms and preferred embodiments of the present invention have been shown in the drawings and described in the specification it is understood that they may be modified to obtain alternative embodiments as deemed desirable within the scope of the appended claims.

I claim:

1. A method of determining the presence and fixing the location of a horizontally disposed, electrically resistive geological anomaly in an earth formation lateral to but not cut by a well bore when said anomaly lies in the vicinity of a massive vertically disposed, electrically resistive geological anomaly likewise lateral to but not cut by said well bore, comprising:

a. traversing said well bore with an electrode array comprising a current source electrode, A, to pass current into earth formations cut by said well bore, a first potential electrode, M, positioned a first predetermined vertical distance below said source electrode, and a second potential electrode, N, positioned a second predetermined vertical distance above said source electrode, said electrodes forming a "split array" spanning a given interval of said well bore, b. energizing said current source electrode, A, and a sink electrode, B, at the earth's surface to pass current into said formations cut by said well bore as well as formations lateral to but not cut by said well bore and measuring the difference of potential between said first and said second potential electrodes, M and N, c. determining the apparent resistivity $\rho A$ over the spanned interval between said potential electrodes including said earth formations cut by and lateral to but not cut by said well bore in accordance with the relationship:

$$\rho_A = (4\pi\Delta V/IG)$$

where $\Delta V$ = measured potential difference between potential electrodes, M and N
I = current emitted by source electrodes
G = tool geometry factor = 1/AM − 1/AN
where AM = distance from the current source electrode
A to potential electrode A beneath it, taken negative,
AN = distance from the current source electrode A to potential electrode N above it, taken positive, d. comparing said apparent resistivity, determined in accordance with said relationship with resistivity data collected by other electric logging means than said "split array" configuration of step (a) over said spanned interval, the differences between said apparent resistivity and the compared resistivity data indicating the presence and magnitude of horizontally disposed, electrically resistive geological anomalies lateral to and not cut by said well bore and in the presence of said vertically disposed, electrically resistive geological anomalies.

2. The method of claim 1 wherein said apparent resistivity determined in accordance with said relationship is plotted as a function of depth to form a continuous curve, said compared resistivity data collected by other electric logging means than said "split array" configuration of step (a) is plotted as a function of depth to form a continuous curve, the differences between said curves indicating the presence of said horizontally disposed, electrically resistive geological anomalies lateral to and not cut by said well bore and in the presence of said vertically disposed, electrically resistive geological anomalies.

3. The method of claim 2 wherein said first potential electrode and said second potential electrode are positioned at equal distances from said current source electrode.

4. The method of claim 3 wherein said equal distances are greater than 75 feet.

5. The method of claim 1 when said massive vertically disposed, electrically resistive anomaly is inclined less than 15° from the axis of said well bore.

6. The method of claim 1 wherein said other means is a conventional short-span electric log used to obtain said resistivity data.

7. The method of claim 1 wherein said other means is an induction log used to obtain said resistivity data.

8. A method of determining the presence and fixing the location of a horizontally disposed, electrically resistiv geological anomaly in an earth formation lateral to but not cut by a well bore when said anomaly lies in the vicinity of a massive vertically disposed, electrically resistive geological anomaly lateral to but not cut by said well bore, comprising:

a. traversing said well bore with an electrode array comprising a current source electrode, A, to pass current into earth formations cut by said well bore, a first potential electrode, M, positioned a predetermined vertical distance greater than 75 feet below said source electrode, and a second potential electrode, N, positioned said predetermined vertical distance greater than 75 feet above said source electrode, said electrodes forming a "split array" spanning a given interval of said well bore, b. energizing said current source electrode, A, and a sink electrode, B, at the earth's surface, to pass current into said formations cut by said well bore as well as formations lateral to but not cut by said well bore and measuring the difference of potential between said first and said second potential electrodes, M and N, c. determining the apparent resistivity of the spanned interval between said potential electrodes including said earth formations cut by and lateral to but not cut by said well bore in accordance with the relationship:

$$\rho_a = (4\pi\Delta V/IG)$$

where $\Delta V$ = measured potential difference between potential electrodes, M and N
I = current emitted by source electrodes
G = tool geometry factor = 1/AM − 1/AN
where AM = distance from the current source electrode A to potential electrode M, taken negative
AN = distance from the current source electrode A to potential electrode N, taken positive d. comparing said apparent resistivity, determined in accordance with said relationship with resistivity data collected by other electric logging means than said "split array" configuration of step (a) over said spanned interval, the differences between said apparent resistivity and the compared resisitivity data indicating the presence and magnitude of horizontally disposed, electrically resistive geological anomalies lateral to and not cut by said well bore and in the presence of said vertically disposed, electrically resistive geological anomalies.

9. The method of claim 6 when said massive vertically disposed, electrically resistive anomaly is inclined less than 15° from the axis of said well bore.

* * * * *